(12) United States Patent
Shibayama et al.

(10) Patent No.: US 10,908,643 B2
(45) Date of Patent: Feb. 2, 2021

(54) PORTABLE INFORMATION DEVICE AND DOCKING DEVICE

(71) Applicant: LENOVO (SINGAPORE) PTE. LTD., Singapore (SG)

(72) Inventors: Yoshiyuki Shibayama, Yokohama (JP); Eiji Shinohara, Yokohama (JP); Hiroaki Agata, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/837,317

(22) Filed: Apr. 1, 2020

(65) Prior Publication Data

US 2020/0225702 A1 Jul. 16, 2020

Related U.S. Application Data

(62) Division of application No. 16/231,435, filed on Dec. 22, 2018, now Pat. No. 10,656,678.

(30) Foreign Application Priority Data

Sep. 21, 2018 (JP) ................................ 2018-176938

(51) Int. Cl.
 *G06F 1/16* (2006.01)
(52) U.S. Cl.
 CPC ............ *G06F 1/1632* (2013.01); *G06F 1/166* (2013.01); *G06F 1/1681* (2013.01); *G06F 1/1683* (2013.01)

(58) Field of Classification Search
 None
 See application file for complete search history.

(56) References Cited

U.S. PATENT DOCUMENTS

| 6,538,642 | B2* | 3/2003 | Tsai ..................... | G06F 1/1626 |
| | | | | 345/168 |
| 8,503,172 | B2* | 8/2013 | Nakamura ............ | G06F 1/1632 |
| | | | | 361/679.49 |
| 9,073,450 | B2* | 7/2015 | Huang ................... | B60R 11/02 |
| 9,329,632 | B2 | 5/2016 | Chang et al. | |
| 9,347,245 | B2 | 5/2016 | Vroom | |
| 2003/0147209 | A1* | 8/2003 | Oross .................... | G06F 1/1632 |
| | | | | 361/679.4 |
| 2004/0145864 | A1* | 7/2004 | Usui ..................... | G06F 1/1632 |
| | | | | 361/679.41 |
| 2004/0212955 | A1 | 10/2004 | Hsieh | |
| 2005/0248917 | A1* | 11/2005 | Hiroyoshi ............. | G06F 1/1632 |
| | | | | 361/679.41 |
| 2007/0041156 | A1* | 2/2007 | Chang .................. | G06F 1/1632 |
| | | | | 361/679.45 |

(Continued)

FOREIGN PATENT DOCUMENTS

JP 2016167181 A 9/2016

*Primary Examiner* — Xanthia C Cunningham
(74) *Attorney, Agent, or Firm* — Shimokaji IP

(57) ABSTRACT

A portable information device has a configuration in which a body chassis and a display chassis are turnably coupled by hinge mechanisms. The portable information device is provided with an operation portion operable from the outside and a power transmission portion provided between the operation portion and the hinge mechanism and transmitting an operating force to the operation portion to the hinge mechanisms to turn the body chassis and the display chassis.

6 Claims, 11 Drawing Sheets

(56) References Cited

U.S. PATENT DOCUMENTS

| | | | |
|---|---|---|---|
| 2007/0177347 A1* | 8/2007 | Nishiyama | G06F 1/1632 361/679.41 |
| 2008/0002353 A1* | 1/2008 | Carnevali | G06F 1/1632 361/679.41 |
| 2011/0141685 A1* | 6/2011 | Hung | G06F 1/1632 361/679.43 |
| 2012/0235788 A1* | 9/2012 | Lakirovich | H02J 50/12 340/5.64 |
| 2013/0322011 A1 | 12/2013 | Yeh | |
| 2014/0331454 A1* | 11/2014 | Hsu | G06F 1/1681 16/368 |
| 2017/0269638 A1* | 9/2017 | Chen | E05D 13/14 |
| 2018/0198308 A1 | 7/2018 | Files et al. | |
| 2018/0316210 A1* | 11/2018 | Rittenhouse | G06F 1/1632 |

* cited by examiner

PORTABLE INFORMATION DEVICE AND DOCKING DEVICE

CROSS REFERENCE TO RELATED APPLICATION

This application is a division of U.S. application Ser. No. 16/231,435 filed on Dec. 22, 2018, which is incorporated herein in its entirety.

FIELD OF THE INVENTION

The present invention relates to a portable information device and a docking device to which a portable information device is detachably attached.

BACKGROUND OF THE INVENTION

A portable information device which is configured so as to be lightweight and compact in consideration of portability is limited in the functions thereof in many cases. Also in a Laptop PC, for example, a reduction in weight or thickness is achieved by limiting the functions in some cases. To such a Laptop PC, a docking device is provided as a dedicated device for extending the functions. For example, a docking device proposed in Japanese Patent No. 6025890 extends the functions by being connector-connected to the Laptop PC.

SUMMARY OF THE INVENTION

In the case of the portable information device, such as a Laptop PC, a user needs to hold a display chassis provided with a display with a hand to turn the display chassis from a body chassis provided with a keyboard. Therefore, a handicapped user or a user whose hands are stained by work in a plant or the like cannot smoothly open the display chassis in some cases. Then, it has been considered to mount an electric opening and closing mechanism in the portable information device itself. However, it is not easy to mount such a function in a thinner portable information device. More specifically, such a portable information device has been demanded to have a configuration in which a user can turn two chassis without directly holding the chassis with hands. Needless to say, it is desirable that such a configuration can be similarly used also in a state where the portable information device is mounted in the docking device described above.

The present invention has been made considering the above-described problems in the conventional technique. It is an object of the present invention to provide a portable information device which allows a user to turn two chassis without holding the chassis with hands and a docking device capable of turning the two chassis of the portable information device attached to the docking device.

A portable information device according to a first aspect of the present invention is a portable information device in which a first chassis and a second chassis are turnably coupled by hinge mechanisms and which is provided with an operation portion operable from the outside and a power transmission portion provided between the operation portion and the hinge mechanisms and transmitting an operating force to the operation portion to the hinge mechanisms to turn the first chassis and the second chassis.

According to such a configuration, the first chassis and the second chassis can be turned using the operation portion. Therefore, such a configuration eliminates the necessity of an action of pressing one chassis with one hand and holding the other chassis with the other hand to open and close the chassis, for example. Therefore, even in the case of a handicapped user or a user whose hands are stained, for example, the two chassis can be smoothly turned, and thus high convenience is obtained.

A configuration may be acceptable in which an operation hole enabling the contact with the operation portion by an external driving terminal is provided at a position facing at least one part of the operation portion. Thus, in the portable information device, the operation portion can be operated by an easy operation of merely passing the external driving terminal through the operation hole.

A configuration may be acceptable in which the hinge mechanisms each have a rotation shaft relatively turning the first chassis and the second chassis, the power transmission portion is provided so as to be integrally rotatable with the rotation shaft, and the operation portion is provided so as to be integrally rotatable with the power transmission portion and has an engagement portion to be engaged with the external driving terminal. Thus, although the configuration is simple, the hinge mechanisms can be smoothly and easily operated from the outside through the operation portion and the power transmission portion.

A configuration may be acceptable in which each hinge mechanism has a first attachment portion fixed to the first chassis, a first shaft portion provided integrally with the first attachment portion, a second attachment portion fixed to the second chassis, and a second shaft portion which is provided integrally with the second attachment portion and which is relatively rotatable to the first shaft portion, and the power transmission portion has a rotor provided so as to be integrally rotatable with one shaft portion of the first shaft portion and the second shaft portion. Thus, the two chassis can be turned by operating the hinge mechanisms by merely operating the rotor to turn from the outside of the chassis using a predetermined instrument or the like. Therefore, although the configuration is simple, high operability is obtained.

A configuration may be acceptable in which the rotor is provided coaxially with the one shaft portion and the operation portion is provided so as to be integrally rotatable with the rotor. Thus, a torque of the rotor as it is can be utilized for the rotation of the one shaft portion. Therefore, there is no necessity of providing a complicated gear mechanism and the like in the portable information device, and thus a reduction in thickness or weight of the chassis is not blocked.

A configuration may be acceptable in which the first chassis has a keyboard, the second chassis has a display, and the rotor is coupled to the second shaft portion and is integrally rotatable with the second shaft portion. Thus, the second shaft portion attached to the second chassis mounted with the display can be directly operated to turn from the operation portion. Therefore, the second chassis can be smoothly turned to the first chassis mounted with the keyboard.

A docking device according to a second aspect of the present invention is a docking device which is detachably connected to a portable information device in which a first chassis and a second chassis are turnably coupled by hinge mechanisms and which is provided with a device placement portion on which the portable information device is placed and a driving portion having a driving terminal performing a turning operation to the hinge mechanisms of the portable information device placed on the device placement portion.

According to such a configuration, the two chassis of the attached portable information device can be turned by the driving portion. Therefore, the chassis of the portable information device attached to the docking device can be smoothly opened and closed even in the case of a handicapped user or a user whose hands are stained, for example, and thus high convenience is obtained.

A configuration may be acceptable in which the driving terminal has a drive-side engagement portion capable of being engaged with an engagement portion provided in the portable information device. Thus, although the configuration is simple, the operation portion can be certainly operated by the driving portion.

A configuration may be acceptable in which the driving portion has a motor rotating the driving terminal. Thus, the two chassis of the attached portable information device can be electrically turned using the motor, and thus higher convenience is obtained.

A configuration may be acceptable in which a connection mechanism portion erecting on a side portion of the device placement portion and disposed facing the side surface of the portable information device placed on the device placement portion is provided and the driving terminal is provided so as to be able to advance and retract to/from the side surface of the portable information device from the connection mechanism portion.

A configuration may be acceptable in which the device placement portion can place the portable information device with a front-down angle attitude by supporting the rear end side of the portable information device having a front end side to be disposed abutting on the use surface, the driving terminal is turnably supported to the connection mechanism portion, and a position adjustment mechanism adjusting the driving terminal to a position where the driving terminal can be engaged with the engagement portion according to the placement angle of the portable information device placed on the device placement portion is provided. Thus, when docking portable information devices different in specification, the driving terminal is adjusted to a position according to the placement angles of the portable information devices. Therefore, the driving terminal can be certainly disposed facing the operation portion provided on the side surface of the portable information device, and thus both the portable information device and the docking device can be smoothly and certainly connected to each other. As a result, the docking device can be docked with a plurality of kinds of portable information devices, and thus high flexibility is obtained.

A configuration may be acceptable in which a connector movably supported to the device placement portion together with the driving terminal and connectable to a connection terminal provided on the side surface of the portable information device placed on the device placement portion is provided and the position adjustment mechanism moves the connector together with the driving portion according to the placement angle to adjust the connector to a position where the connector can be connected to the connection terminal. Thus, the positions of the driving terminal and the connector can be simultaneously adjusted by the position adjustment mechanism.

According to the above-described aspects of the present invention, the two chassis can be turned without holding the chassis with hands.

DETAILED DESCRIPTION OF THE INVENTION

Hereinafter, preferable embodiments of a portable information device and a docking device according to the present invention are described in detail with reference to the attached drawings.

Figure 1:
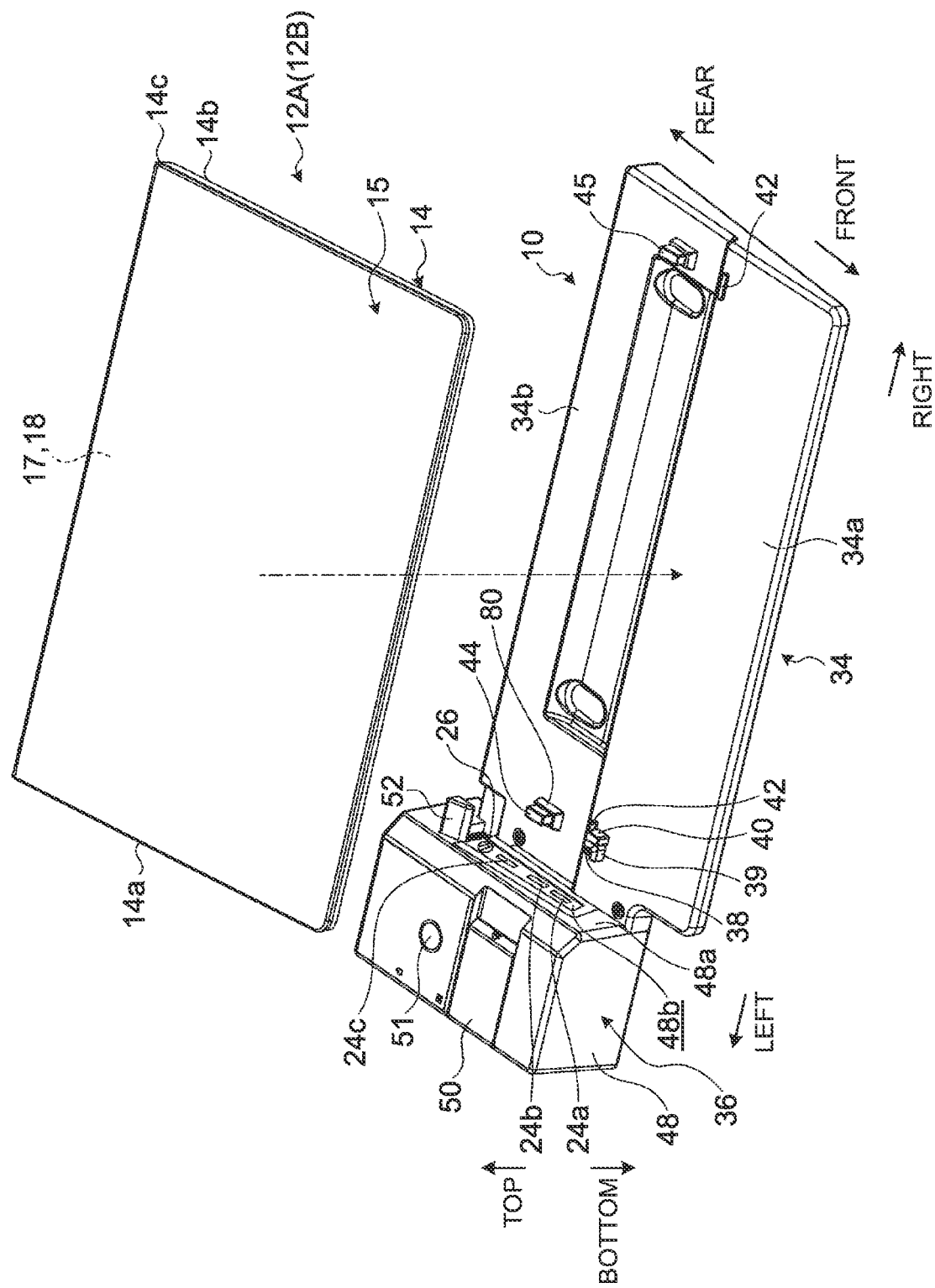
FIG. 1 is an exploded perspective view illustrating an operation of docking a portable information device to a docking device according to one embodiment.
Figure 2A:
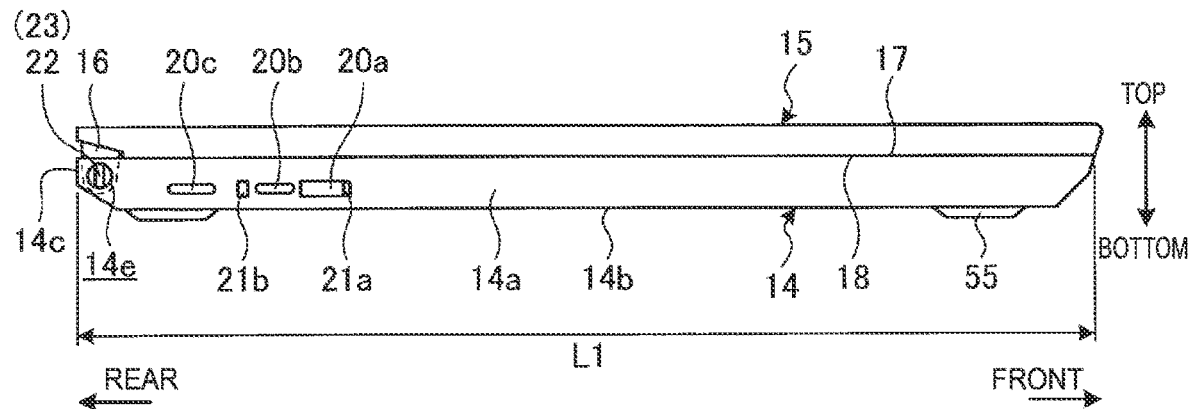
FIG. 2A is a side view of the portable information device.
Figure 2B:
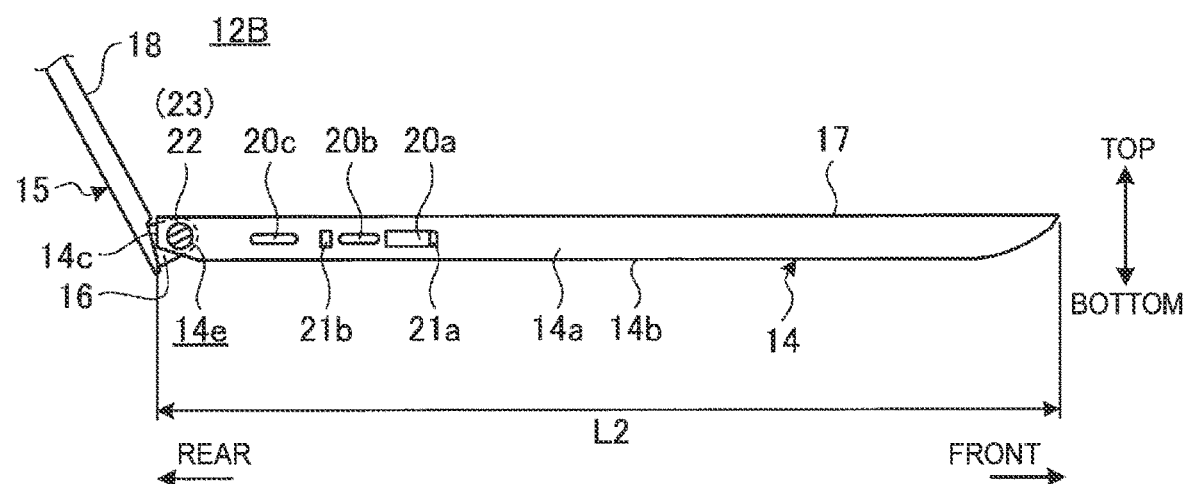
FIG. 2B is a side view of a portable information device having a specification different from the specification of the portable information device illustrated in FIG. 2A.

FIG. 1 is an exploded perspective view illustrating an operation of docking a portable information device 12A to a docking device 10 according to one embodiment. FIG. 2A is a side view of the portable information device 12A. FIG. 2B is a side view of a portable information device 12B having a specification different from the specification of the portable information device 12A illustrated in FIG. 2A.

To the docking device 10, the portable information devices 12A and 12B which are Laptop PCs, for example, are detachably attached. The portable information device 12A and the portable information device 12B are different from each other at least in the outer shape. To the docking device 10, a plurality of kinds of portable information devices besides the portable information devices 12A and 12B are detachably attached. Hereinafter, the cases where the two kinds of the portable information devices 12A and 12B are detached and attached are typically described. The docking device 10 extends the functions of the portable information devices 12A and 12B, such as connecting the attached portable information devices 12A and 12B to a plurality of peripheral devices or networks. The docking device 10 of this embodiment also has a function of opening and closing a display chassis 15 of each of the attached portable information devices 12A and 12B. The docking device 10 may be configured so that only one of the portable information devices 12A and 12B, i.e., a portable information device of one specification, is detachably attached.

Hereinafter, a description is given based on a definition that the front side and the deep side in FIG. 1 are referred to as "front and rear", respectively, the thickness direction of the docking device 10 or the portable information device 12A (12B) is referred to as "top and bottom", and the width direction is referred to as "right and left" based on a state where the portable information device 12A (12B) is mounted on the docking device 10 as a reference.

As illustrated in FIG. 2A, the portable information device 12A as an example of a connection target to the docking device 10 is a clamshell type in which the display chassis 15 is turnably coupled to a body chassis 14 by hinge mechanisms 16. In the portable information device 12A, a keyboard 17 is provided on the upper surface of the body chassis 14 and a display 18 is provided on the undersurface of the display chassis 15. The keyboard 17 may be configured by an on-screen keyboard (software keyboard) containing a touch-type liquid crystal display. On a left side surface (side surface 14a) of the body chassis 14, connection terminals 20a, 20b, and 20c, guide holes 21a and 21b, and an operation portion 22 are provided.

The connection terminals 20a to 20c are arranged in parallel in the forward and backward direction at positions close to the rear end side of the side surface 14a. The connection terminals 20a to 20c are connectable with connectors 24a to 24c (see FIG. 6) of the docking device 10. The docking device 10 is electrically connected to the portable information device 12A by connecting the connectors 24a to 24c to the connection terminals 20a to 20c, respectively. This makes it possible for the portable information device 12A to use various extension functions mounted in the docking device 10. The connection terminals 20a to 20c and the connectors 24a to 24c may be configured by an independent structure, a double structure, or the like, for example, besides the triple structure. The connectors 24a to 24c and the connection terminals 20a to 20c conform to the connection standard conforming to the USB (Universal Serial Bus) standard, for example. A configuration may be acceptable in which the docking device 10 is connected to the portable information device 12A by a radio system or a non-contact connection system in place of the connection terminals 20a to 20c and the connectors 24a to 24c.

The guide holes 21a and 21b are provided so as to be aligned with the connection terminals 20a to 20c. Into the guide holes 21a and 21b, guide pins 25a and 25b (see FIG. 6) provided so as to be aligned with the connectors 24a to 24c of the docking device 10 are inserted. By the insertion of the guide pins 25a and 25b into the guide holes 21a and 21b, respectively, the connectors 24a to 24c and the connection terminals 20a to 20c are mutually positioned, so that the connectors 24a to 24c and the connection terminals 20a to 20c are certainly and smoothly connected. The installation number of the guide holes and the guide pins may be changed or the guide holes and the guide pins may be omitted.

Figure 3A:
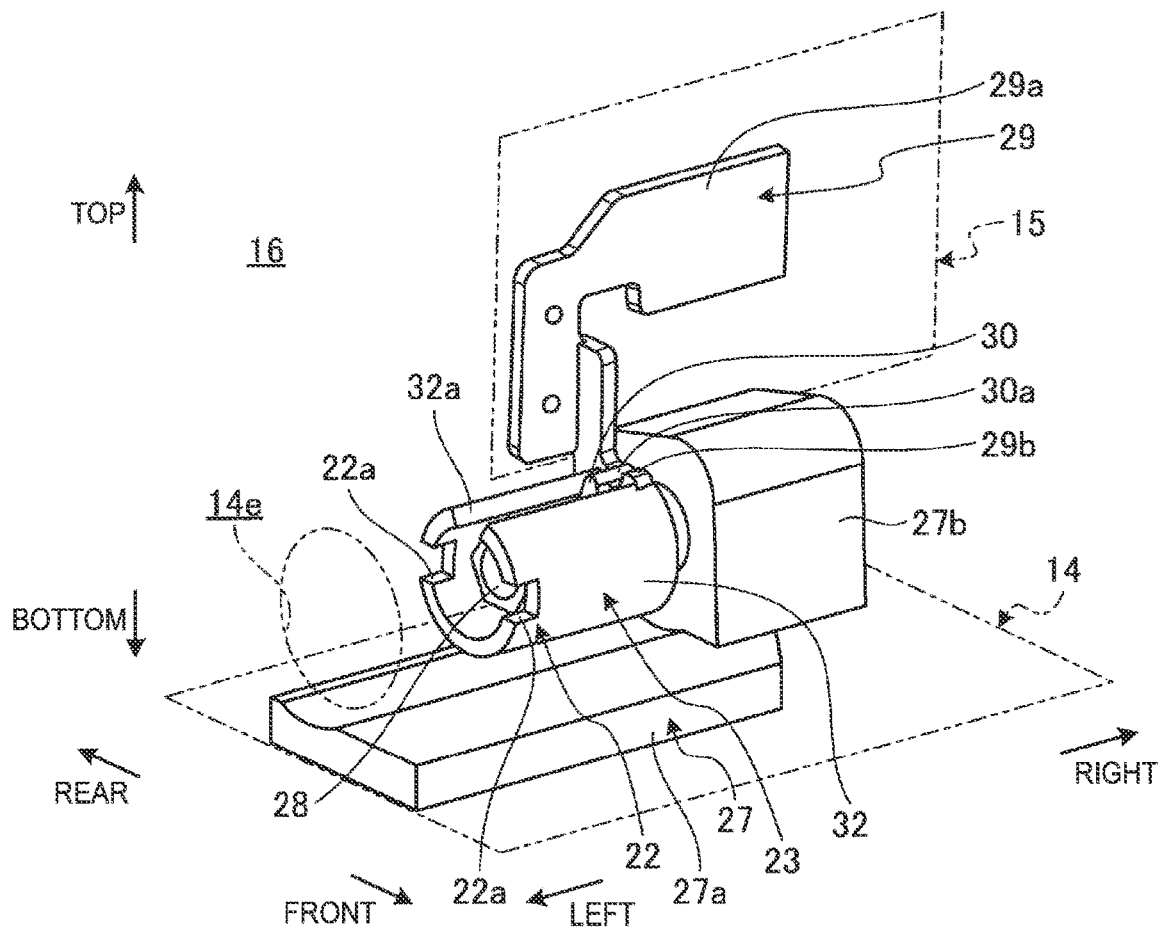
FIG. 3A is an enlarged perspective view of a principal portion illustrating configuration examples of hinge mechanism and an operation portion in a state where the display chassis is opened to about 90° from the state illustrated in FIG. 3A.
Figure 3B:
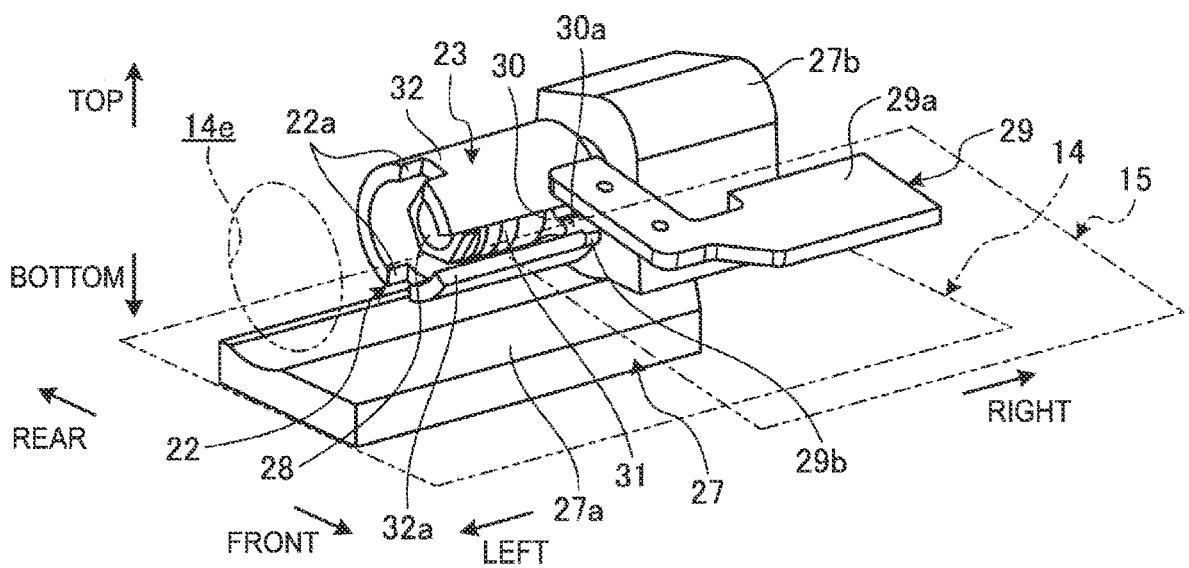
FIG. 3B is an enlarged perspective view of a principal portion illustrating configuration examples of the hinge mechanism and the operation portion in a state where a display chassis is closed.
Figure 3C:
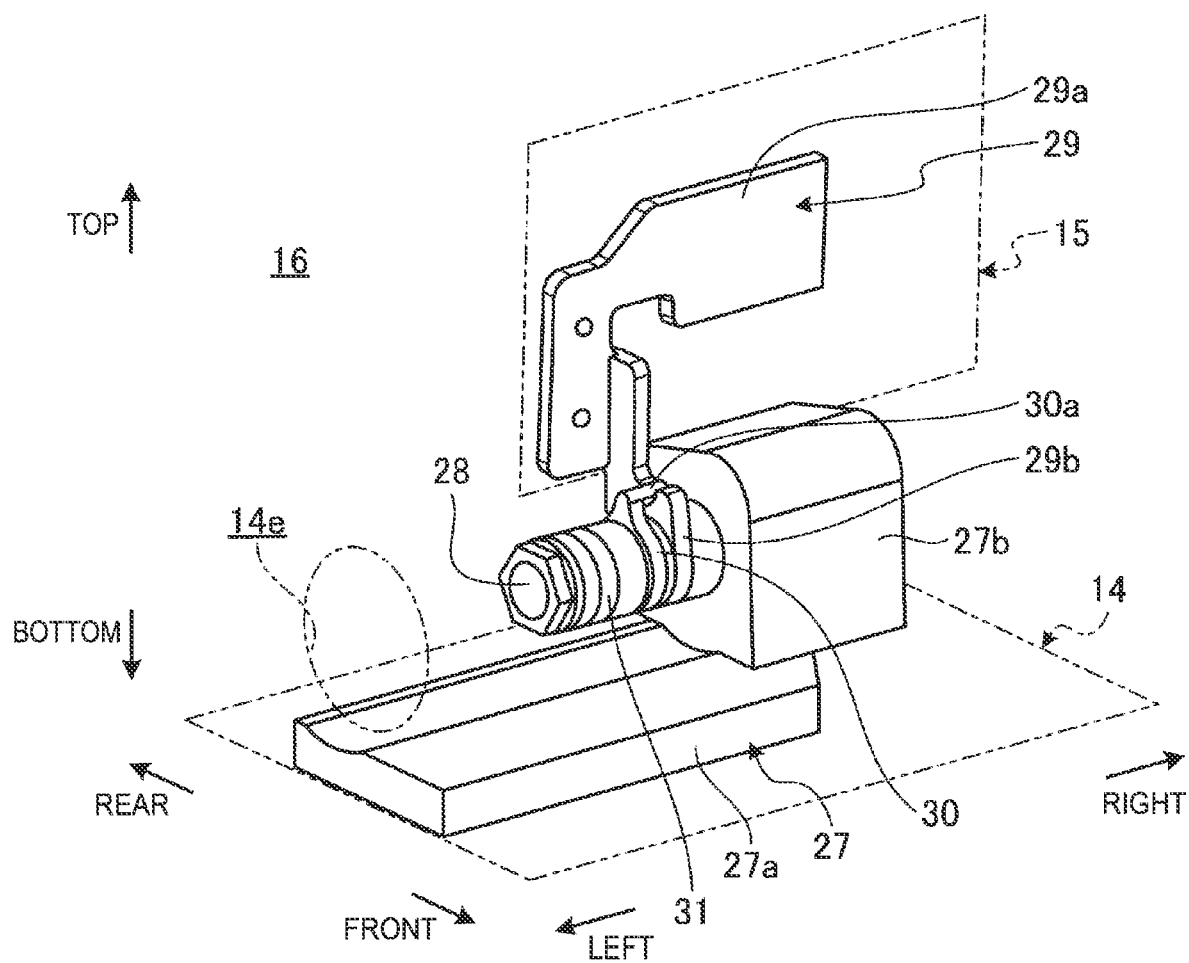
FIG. 3C is an enlarged perspective view of a principal portion illustrating a state where the operation portion is omitted from the hinge mechanism illustrated in FIG. 3A.

The operation portion 22 is configured so as to operate the hinge mechanisms 16 from the outside to turn the display chassis 15 from the body chassis 14. An operating force to the operation portion 22 is transmitted to the hinge mechanisms 16 through a power transmission portion 23. FIG. 3A is an enlarged perspective view of a principal portion illustrating configuration examples of the hinge mechanisms 16, the operation portion 22, and the power transmission portion 23 in a state where the display chassis 15 is closed. FIG. 3B is an enlarged perspective view of a principal portion illustrating configuration examples of the hinge mechanisms 16, the operation portion 22, and the power transmission portion 23 in a state where the display chassis 15 is opened to about 90° from the state illustrated in FIG. 3A. FIG. 3C is an enlarged perspective view of a principal portion illustrating a state where the operation portion 22 and the power transmission portion 23 are omitted from the hinge mechanisms 16 illustrated in FIG. 3A.

As illustrated in FIG. 3A and FIG. 3B, the operation portion 22 is coupled to the hinge mechanism 16 through the power transmission portion 23. The operation portion 22 faces an operation hole 14e formed in the side surface 14a of the body chassis 14 and can be operated from the outside of the body chassis 14 through the operation hole 14e (see FIG. 2A, FIG. 2B, and FIG. 8A). The operation hole 14e is an opening which makes it possible to bring an instrument (driving terminal 26a in this embodiment) for operating the operation portion 22 into contact with the operation portion 22 from the outside of the body chassis 14. In the case of this embodiment, the operation portion 22 is integrally formed with the power transmission portion 23. The operation portion 22 of this embodiment can be operated by a driving portion 26 (see FIG. 1 and FIG. 6) of the docking device 10. The driving portion 26 is configured so as to operate the operation portion 22 to rotate by the insertion of a driving terminal 26a having a shape like a minus driver at the tip into the operation hole 14e (see FIG. 8A and FIG. 8B). Although this embodiment describes the configuration in which the operation portion 22 is provided on the hinge mechanism 16 on the left side as an example, the operation portion 22 may be provided on the hinge mechanism 16 on the right side or may be provided on both the right and left hinge mechanisms 16. The operation portion 22 may not entirely face the operation hole 14e and may partially face the operation hole 14e. For example, when the driving terminal 26a is formed by a pair of protruding portions corresponding to a pair of recessed portions (engagement portions 22a) of the operation portion 22, the operation hole 14e may be configured by a pair of small-diameter hole portions or the like provided in a diagonal direction so that the pair of protruding portions can be inserted. The operation hole 14e may be configured by a component, such as a shutter, so as to be openable and closable.

Prior to the description of the operation portion 22 and the power transmission portion 23, a configuration example of the hinge mechanisms 16 is first described. As illustrated in FIG. 3A to FIG. 3C, the hinge mechanisms 16 each have a first attachment portion 27, a first shaft portion 28, a second attachment portion 29, and a second shaft portion 30.

The first attachment portion 27 has an attachment plate 27a and a support base 27b. The attachment plate 27a is a plate-like member fixed to the body chassis 14 with a screw or the like. The support base 27b is a block-like member serving as the base of the hinge mechanism 16 and is integral with the attachment plate 27a. The first shaft portion 28 is a shaft projecting toward the left side from one side surface of the support base 27b. The first shaft portion 28 is fixed in an unrotatable state to the support base 27b. Thus, the first attachment portion 27 and the first shaft portion 28 are integrally provided in a relatively unmovable state to the body chassis 14.

The second attachment portion 29 has an attachment plate 29a and a support ring 29b. The attachment plate 29a is a plate-like member fixed to the display chassis 15 with a screw or the like. The support ring 29b is a ring-like member which is externally inserted into the first shaft portion 28 and which is supported so as to be relatively rotatable to the first shaft portion 28 and is integral with the attachment plate 29a. The second shaft portion 30 is a circular ring externally inserted into the first shaft portion 28 on the left side of the support ring 29b and is supported so as to be relatively rotatable to the first shaft portion 28. In the second shaft portion 30, a projection piece 30a projecting to the right side from one part of the outer peripheral surface is fitted to a recessed portion formed in the outer peripheral surface of the support ring 29b. Thus, the second attachment portion 29 and the second shaft portion 30 are integrally provided in a relatively unmovable state to the display chassis 15 and can integrally rotate around the shaft of the first shaft portion 28. In other words, the second shaft portion 30 (and support ring 29b) functions as a bearing rotatably holding the first shaft portion 28 which is a shaft.

Therefore, in the portable information device 12A, when the display chassis 15 is turned from the body chassis 14, the hinge mechanism 16 rotates from the state illustrated in FIG. 3A to the state illustrated in FIG. 3B. As a result, the turning angle between the display chassis 15 and the body chassis 14 can be changed. In the hinge mechanism 16, the first shaft portion 28 may be configured by a circular bearing and the second shaft portion 30 may be configured by a shaft. Thus, the hinge mechanisms 16 can relatively turn the body chassis 14 and the display chassis 15 with the first shaft portion 28 or the second shaft portion 30 as the rotation shaft. The reference numeral 31 in FIG. 3C denotes a torque generating portion generating a predetermined rotation torque between the first shaft portion 28 and the second shaft portion 30.

Next, specific configuration examples of the operation portion 22 and the power transmission portion 23 are described.

As illustrated in FIG. 3A and FIG. 3B, the operation portion 22 is provided with the engagement portions 22a provided in an end portion of a rotor 32 configuring the power transmission portion 23. The power transmission portion 23 is provided with the rotor 32 transmitting the operating force to the operation portion 22 to the hinge mechanism 16. The rotor 32 is a cylindrical body having a C-shaped cross section in which a crack (slot) 32a in the axial direction is formed in one part of the outer peripheral surface. The rotor 32 is externally inserted into the first shaft portion 28 and the second shaft portion 30 and is provided coaxially with the first shaft portion 28 and the second shaft portion 30. In the rotor 32, a right end portion of the crack (slot) 32a is fitted to the projection piece 30a of the second shaft portion 30 and the support ring 29b. Thus, the rotor 32 is integrally rotatable with the second shaft portion 30 (and support ring 29b) around the shaft of the first shaft portion 28.

A left end portion of the rotor 32 projects to the left side relative to the tip of the first shaft portion 28. The engagement portions 22a of the operation portion 22 are configured by a pair of recessed portions in which the end surface of the left end portion of the rotor 32 is partially dented in the axial direction. The recessed portions configuring the engagement portions 22a of this embodiment are aligned in the diameter direction of the rotor 32 and face each other. The engagement portions 22a each have a shape which allows the engagement of an instrument having the tip like a minus driver. With the engagement portions 22a, a device-side engagement portion 26d of the driving terminal 26a of the docking device 10 can be engaged (see FIG. 8B).

As described above, to the docking device 10 of this embodiment, the portable information device 12B of another specification different in the forward and backward direction dimension from the portable information device 12A illustrated in FIG. 2A can also be attached and detached. As illustrated in FIG. 2B, the portable information device 12B as another example of a connection target to the docking device 10 has the same structure as that of the portable information device 12A illustrated in FIG. 2A, except that the forward and backward direction dimension and the thickness dimension are different. For the portable information device 12B illustrated in FIG. 2B, the same or similar elements as/to those of the portable information device 12A illustrated in FIG. 2A are designated by the same reference numerals, and detailed descriptions are omitted.

As illustrated in FIG. 2B, the portable information device 12B has a forward and backward direction dimension L2 shorter than a forward and backward direction dimension L1 of the portable information device 12A. However, in the portable information device 12A and the portable information device 12B, the pitches from rear end surfaces 14c thereof to the connectors 24a to 24c, the guide holes 21a and 21b, and the operation portion 22 are set to the same or substantially the same pitches. Moreover, in the portable information device 12A and the portable information device 12B, the pitches from bottom surfaces 14b thereof to the connectors 24a to 24c, the guide holes 21a and 21b, and the operation portion 22 are also set to the same or substantially the same pitches. The arrangement relationship between the connectors 24a to 24c, the guide holes 21a and 21b, and the operation portion 22 may be similarly set also for portable information devices of different specifications to be attached to the docking device 10.

Figure 4A:
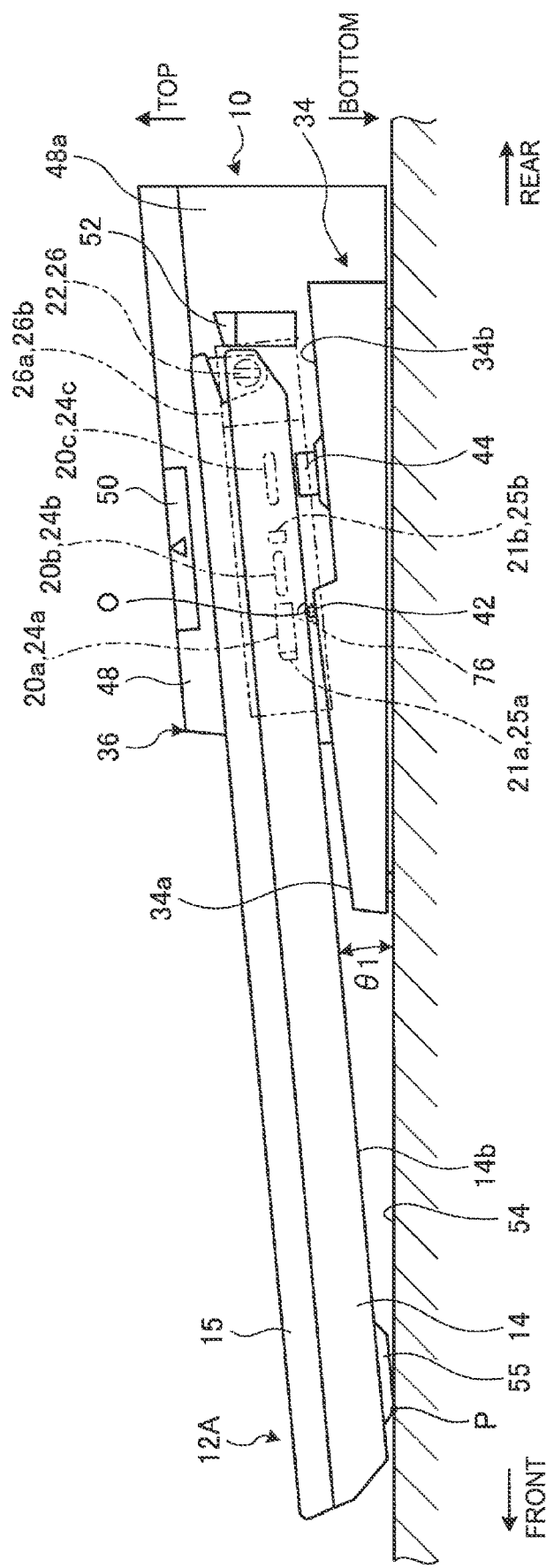
FIG. 4A is a side view schematically illustrating a state where the portable information device illustrated in FIG. 2A is attached to the docking device.
Figure 4B:
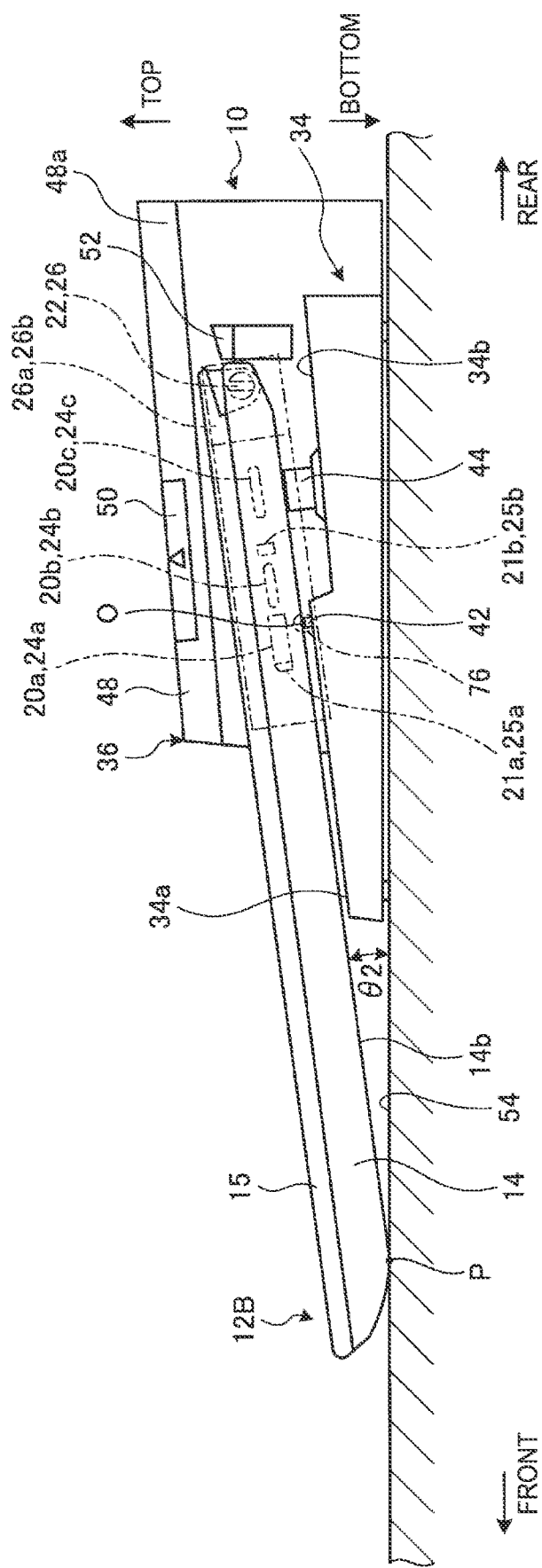
FIG. 4B is a side view schematically illustrating a state where the portable information device illustrated in FIG. 2B is attached to the docking device.

FIG. 4A is a side view schematically illustrating a state where the portable information device 12A illustrated in FIG. 2A is attached to the docking device 10. FIG. 4B is a side view schematically illustrating a state where the portable information device 12B illustrated in FIG. 2B is attached to the docking device 10.

As illustrated in FIG. 1, FIG. 4A, and FIG. 4B, the body chassis 14 of the portable information device 12A or the portable information device 12B is placed on the docking device 10. The docking device 10 has a device placement portion 34 and a connection mechanism portion 36.

The device placement portion 34 is a thin box body having an upper surface of a size where substantially half parts of the rear sides of the portable information devices 12A and 12B can be placed and is formed of resin or the like, for example. The device placement portion 34 is provided with a placement table 34a where the bottom surface 14b of each of the portable information devices 12A and 12B is placed. The placement table 34a is an inclined surface inclined so that the height dimension gradually increases from the front side toward the rear side. On the rear side of the placement table 34a, a relief portion 34b formed lower by one stage from the placement table 34a is provided. The relief portion 34b is a dent for avoiding a battery and the like, which are not illustrated, when the battery and the like project from the undersurface on the rear side of each of the portable information devices 12A and 12B.

Figure 5:
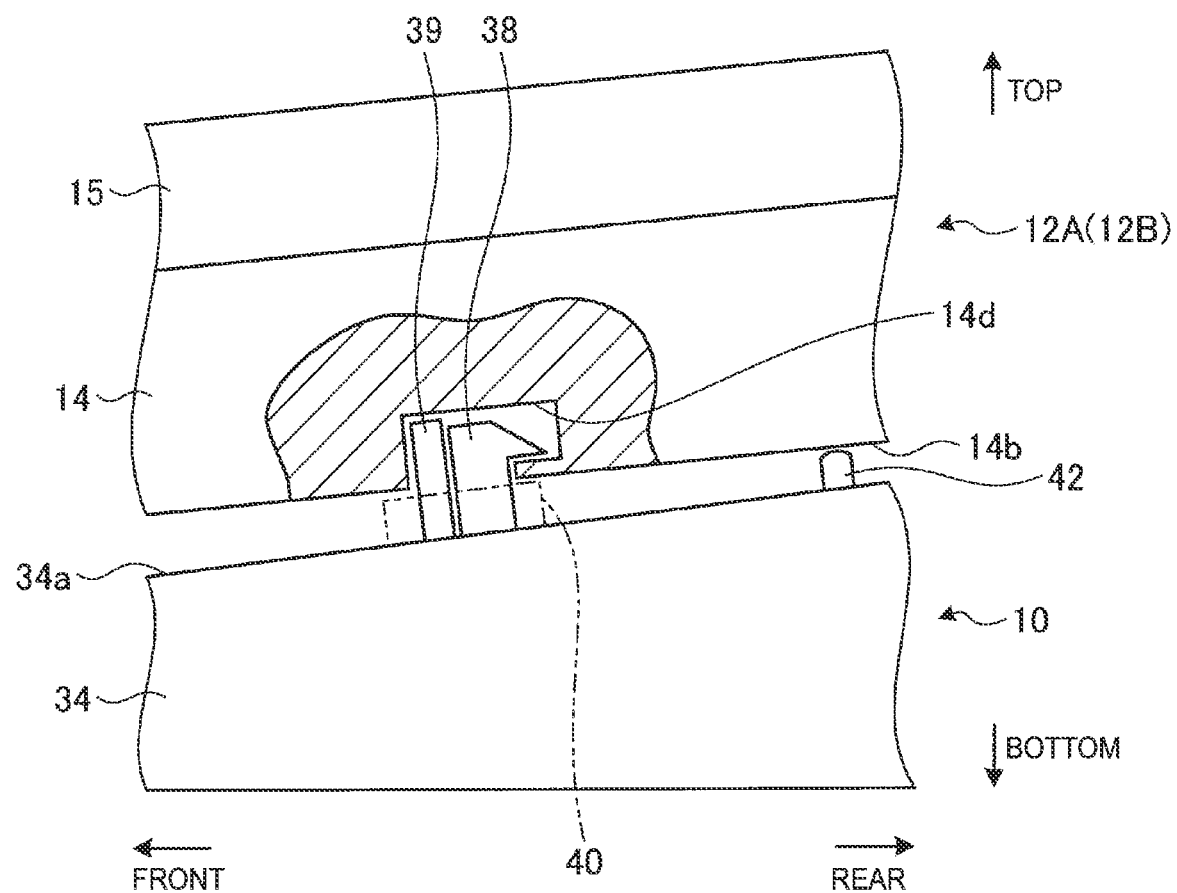
FIG. 5 is a partially enlarged cross-sectional view schematically illustrating an engagement structure of a hook and an engagement hole.

In the placement table 34a, an engagement projection 38, a guidepost 39, and a detection pin 40 project near the left end of the upper surface. In the engagement projection 38, a hook portion directed backward on the upper end thereof is elastically energized backward. As illustrated in FIG. 5, the engagement projection 38 can be engaged with an engagement hole 14d provided in the bottom surface 14b of each of the portable information devices 12A and 12B. By the engagement of the engagement projection 38 with the engagement hole 14d, the portable information devices 12A and 12B each are fixed to the device placement portion 34 while being prevented from vertically slipping out. A guidepost 39 is inserted into the engagement hole 14d together with the engagement projection 38 to position each of the portable information devices 12A and 12B in all directions. The detection pin 40 can be pressed down by the bottom surface 14b of each of the portable information devices 12A and 12B.

On both right and left end sides of the upper surface of the placement table 34a, leg members 42 for supporting the bottom surfaces 14b of the portable information devices 12A and 12B are individually provided. The right and left leg members 42 and 42 are aligned along the horizontal direction and the forward and backward direction positions thereof on the upper surface of the placement table 34a are in agreement or substantially agreement with each other. The leg members 42 are square-shaped projections extending in the horizontal direction and are formed of resin, hard rubber, and the like, for example.

The relief portion 34b is provided with a lifting member 44 on the left end side of the upper surface and is provided with a rear supporting leg 45 on the right end side of the upper surface. The lifting member 44 can move up and down by being pressed with a rear end side portion of the bottom surface 14b of each of the portable information devices 12A and 12B placed on the placement table 34a. The lifting member 44 is a detector detecting a placement angle θ to the device placement portion 34 of each of the portable information devices 12A and 12B. The rear supporting leg 45 supports the rear end side portion of the bottom surface 14b of each of the portable information devices 12A and 12B placed on the placement table 34a. The rear supporting leg 45 is provided so as to be movable up and down and supports each of the portable information devices 12A and 12B at a predetermined raised position by an elastic member, a stopper mechanism, or the like which is not illustrated, for example.

The connection mechanism portion 36 has a rectangular parallelepiped-shaped chassis 48 formed of resin or the like. The chassis 48 erects on a side portion of the device placement portion 34 and has a wall portion 48a facing the side surface 14a of each of the portable information devices 12A and 12B placed on the device placement portion 34. The connectors 24a to 24c, the guide pins 25a and 25b (hereinafter sometimes collectively referred to as "connectors 24"), and the driving terminal 26a (see FIG. 6 and FIG. 8A) of the driving portion 26 can advance and retract in the horizontal direction from an opening 48b formed in the wall portion 48a toward the side surface 14a of each the portable information devices 12A and 12B.

On the upper surface of the chassis 48, an operation lever 50 and a power supply button 51 are provided. The operation lever 50 is a portion which a user slides with a hand in order to advance and retract the connectors 24 from the opening 48b. The power supply button 51 is a button for turning ON and OFF the power supply of the docking device 10.

The connection mechanism portion 36 has a positioning member 52 on the rear side of the opening 48b. The positioning member 52 projects toward the right side from the wall portion 48a. The positioning member 52 abuts on the rear end surface 14c of each of the portable information devices 12A and 12B to be placed on the device placement portion 34 to position the forward and backward direction position of each of the portable information devices 12A and 12B. The positioning member 52 is provided so as to be movable up and down so that an opening and closing operation of the display chassis 15 is not interfered and is usually elastically energized upward.

As illustrated in FIG. 4A and FIG. 4B, the docking device 10 is usually placed on a planar use surface 54, such as the upper surface of a desk, to be used. When attached to the docking device 10, each of the portable information devices 12A and 12B is brought into a front-down angle attitude in which the front end side abuts on and supported by the use surface 54 and the rear end side abuts on and supported by the leg members 42 on the placement table 34a. In the case of this embodiment, positions where the bottom surface 14b abuts on the right and left leg members 42 serve as reference points O of the mounting position to the docking device 10 in each of the portable information devices 12A and 12B. In a state where the front end side of each of the portable information devices 12A and 12B is inclined forward and downward based on the reference points O, a landing position P of the bottom surface 14b thereof lands on the use surface 54, so that each of the portable information devices 12A and 12B is stabilized. In the portable information device 12A illustrated in FIG. 4A, rubber legs 55 on the front side provided on the bottom surface 14b serve as the landing positions P.

The portable information device 12A and the portable information device 12B are different from each other in the forward and backward direction dimension. Therefore, the distance from the reference point O to the landing position P is large in the portable information device 12A (see FIG. 4A). On the other hand, the distance from the reference point O to the landing position P is smaller in the portable information device 12B than that in the case of the portable information device 12A (see FIG. 4B). At this time, the forward and backward direction position of the rear end surface 14c is positioned by the positioning member 52 in each of the portable information devices 12A and 12B. As a result, in each of the portable information devices 12A and 12B, the front end side vertically turns in such a manner as to swing with the reference points O on the rear end side as the turning center, so that the landing position P lands on the use surface 54.

The angle of the front-down attitude of the bottom surface 14b to the use surface 54 when the portable information device 12A is attached to the docking device 10 is referred to as a placement angle θ1 (see FIG. 4A) and the angle of the front-down attitude of the bottom surface 14b to the use surface 54 when the portable information device 12b is attached to the docking device 10 is referred to as a placement angle θ2 (see FIG. 4B). Thus, the placement angle θ1 of the portable information device 12A is smaller than the placement angle θ2 of the portable information device 12B. Conversely, the placement angle θ2 of the portable information device 12B is larger than the placement angle θ1 of the portable information device 12A. It is a matter of course that, while the placement angle of a portable information device having a forward and backward direction dimension larger than that of the portable information device 12A becomes smaller, the placement angle of a portable information device having a forward and backward direction dimension smaller than that of the portable information device 12B becomes larger.

Therefore, the angles of the connection terminals 20a to 20c, the guide holes 21a and 21b (hereinafter sometimes collectively referred to as "connection terminals 20"), and the operation portion 22 in the portable information devices 12A and 12B are angles according to the placement angles θ1 and θ2 as illustrated in FIG. 4A and FIG. 4B, respectively. Then, the docking device 10 of this embodiment is provided with a position adjustment mechanism 56 moving the connectors 24 and the driving portion 26 according to changes in the placement angles θ1 and θ2 due to the difference in the forward and backward direction dimensions of the portable information devices 12A and 12B to adjust the connectors 24 and the driving portion 26 to positions where the connectors and the driving portion 26 can be connected to the connection terminals 20 and the operation portion 22.

Next, the configuration of the position adjustment mechanism 56 and the configuration of an advancing and retracting mechanism 58 advancing and retracting the connectors 24 and the driving portion 26 subjected to the angle adjustment by the position adjustment mechanism 56 toward the portable information devices 12A and 12B are described.

Figure 6:
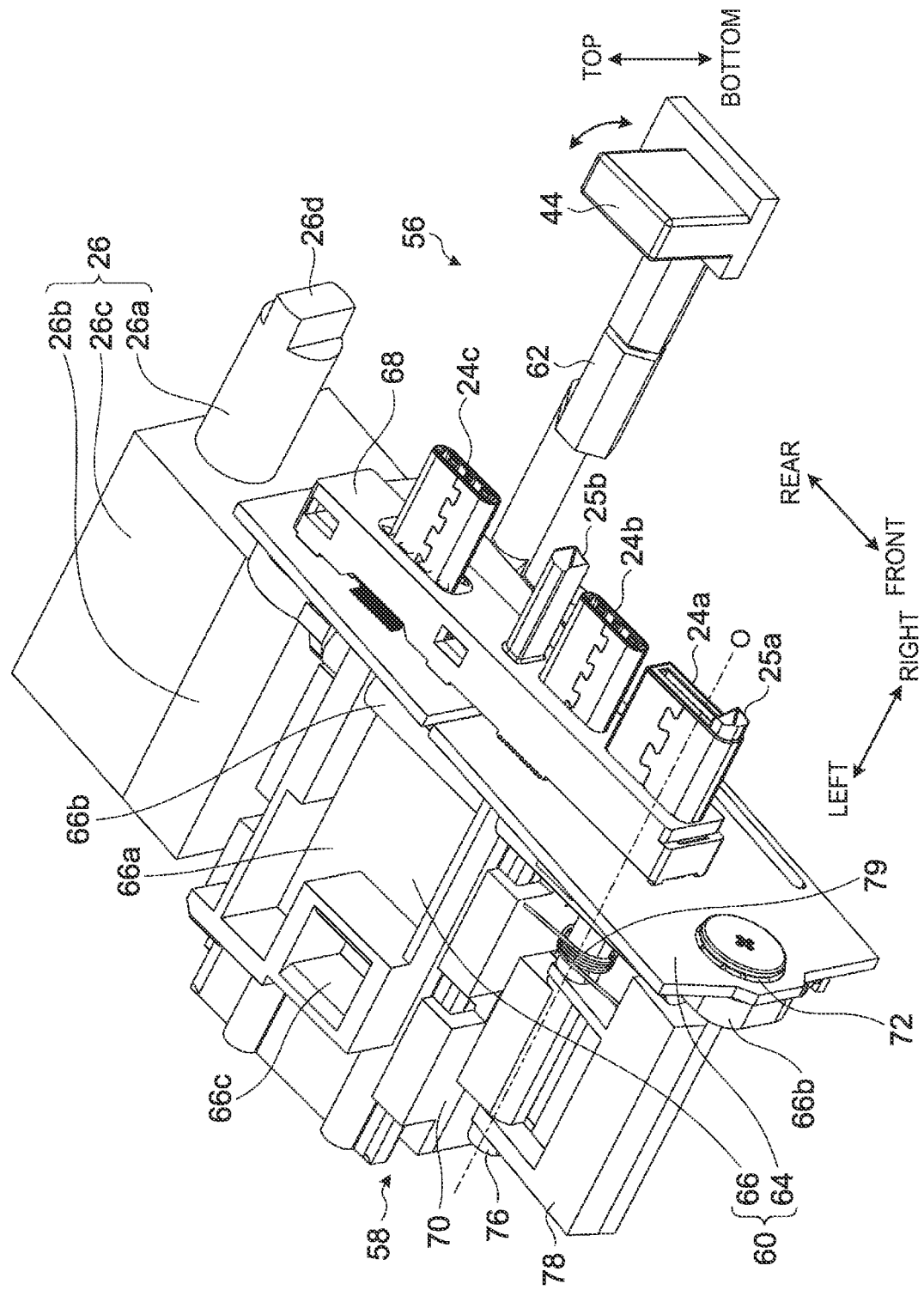
FIG. 6 is a perspective view illustrating a configuration example of a position adjustment mechanism.

FIG. 6 is a perspective view illustrating a configuration example of the position adjustment mechanism 56. As illustrated in FIG. 6, the position adjustment mechanism 56 has a support member 60, an interlocking member 62, and the lifting member 44. The position adjustment mechanism 56 operates on a base plate, which is not illustrated, forming a bottom surface of the docking device 10.

The support member 60 has a substrate 64 and a slide member 66.

The substrate 64 is an electronic substrate to which the connectors 24a to 24c are electrically connected and is a plate-like member extending in the forward and backward direction. The connectors 24 are mounted on the right side surface of the substrate 64 through a rectangular rod-like holder 68. The slide member 66 has a slide portion 66a and a support portion 66b. The slide portion 66a is supported so as to be able to advance and retract in the horizontal direction on the upper surface of the slide base 70. The support portion 66b is a rod-like member extending in the forward and backward direction and coupled and fixed to the left side rear surface of the substrate 64. The slide portion 66a and the support portion 66b are integrally coupled to each other. The support portion 66b supports the substrate 64 through a floating mechanism 72 containing a rubber ring or the like. Furthermore, the support portion 66b supports the driving portion 26.

The driving portion 26 is integrally movable with the support portion 66b by being supported by the support portion 66b. The driving portion 26 has the driving terminal 26a, a motor 26b, and a gear box 26c. The driving terminal 26a is a cylindrical member projecting from the right side surface of the gear box 26c and supported in a state of being rotatable around an axis. In the driving terminal 26a, the device-side engagement portion 26d is formed at the tip. The device-side engagement portion 26d of this embodiment is a protruding portion having the same shape as the shape of a minus driver and can be engaged with the engagement portions 22a of the operation portion 22 (see FIG. 8B). The motor 26b is an electric motor to be energized from a power supply which is not illustrated. The gear box 26c is a decelerator containing a plurality of gears placed between an output shaft of the motor 26b and the driving terminal 26a.

In the driving portion 26, the rotational driving force from the motor 26b is transmitted to the driving terminal 26a through the gear box 26c, and thus the driving terminal 26a rotates around an axis. The motor 26b and the driving terminal 26a can rotate in both the normal and reverse directions.

The slide base 70 is turnably coupled to a bearing member 78 through a turning shaft 76. The turning shaft 76 is a shaft member extending along the horizontal direction. The bearing member 78 is fixed onto the base plate forming the bottom surface of the docking device 10. The support member 60 is turnable in the vertical direction to the chassis 48 with the turning shaft 76 as the center. When the support member 60 turns through the turning shaft 76, the connectors 24 and the driving portion 26 revolve with the turning shaft 76 as the center. At this time, the rear end side of the support member 60 is always energized upward by a torsion coil spring 79 provided around the turning shaft 76. More specifically, the connectors 24 and the driving portion 26 are always energized in a direction where the driving portion 26 side revolves upward relative to the connectors 24a side with the turning shaft 76 as the turning center.

In the case of this embodiment, the docking device 10 has a configuration in which the top surfaces of the leg members 42 are disposed on the extension of a central axis O of the turning shaft 76 (see FIG. 4A and FIG. 4B). More specifically, the extension of the central axis O of the turning shaft 76 is in agreement or substantially agreement with the reference points O which are the support positions of the bottom surface 14b of each of the portable information devices 12A and 12B by the leg members 42.

The interlocking member 62 is a rod-like member coupling the slide base 70 and the lifting member 44. The interlocking member 62 is a rod-like rigid body and transmits a lifting operation of the lifting member 44 to the slide base 70 to turn the slide base 70 with the turning shaft 76 as the center. The lifting member 44 moves up and down in the vertical revolution direction through the slide base 70 with the turning shaft 76 as the center. When the lifting member 44 moves up and down in the revolution direction, the support member 60, the connectors 24, and the driving portion 26 also move up and down in the revolution direction through the slide base 70.

The lifting member 44 projects from an opening formed in the relief portion 34b as illustrated in FIG. 1 and moves up and down in the vertical revolution direction with the turning shaft 76 as the center while being guided by a guide wall 80 surrounding the opening. The lifting member 44 is a detector of the position adjustment mechanism 56 detecting the placement angles θ1 and θ2 of the portable information devices 12A and 12B placed on the device placement portions 34. The lifting member 44 is always positioned at a raised position by the energization force of the torsion coil spring 79. The lifting member 44 is pressed down with the rear end side of the bottom surface 14b of each of the portable information devices 12A and 12B placed on the device placement portion 34. As a result, the lifting member 44 revolves and is lowered to a lowered position according to the placement angles θ1 or θ2 of the portable information device 12A or 12B, respectively, with the turning shaft 76 as the center to be held at the lowered position (see FIG. 4A and FIG. 4B).

Figure 7A:
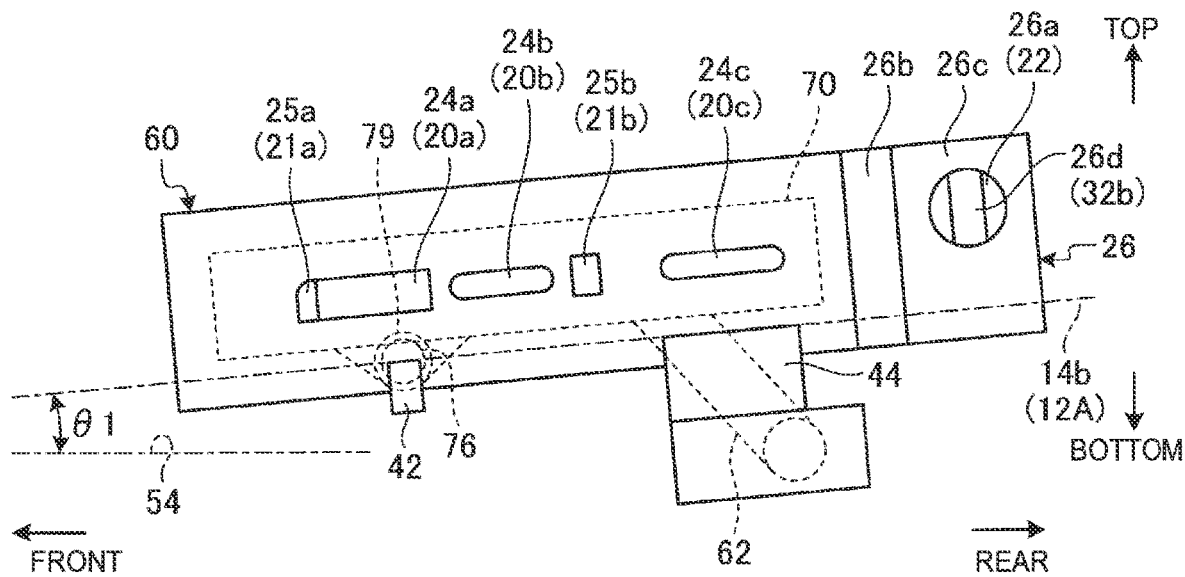
FIG. 7A is a side view schematically illustrating an operating state of the position adjustment mechanism when the portable information device illustrated in FIG. 2A is attached to the docking device.
Figure 7B:
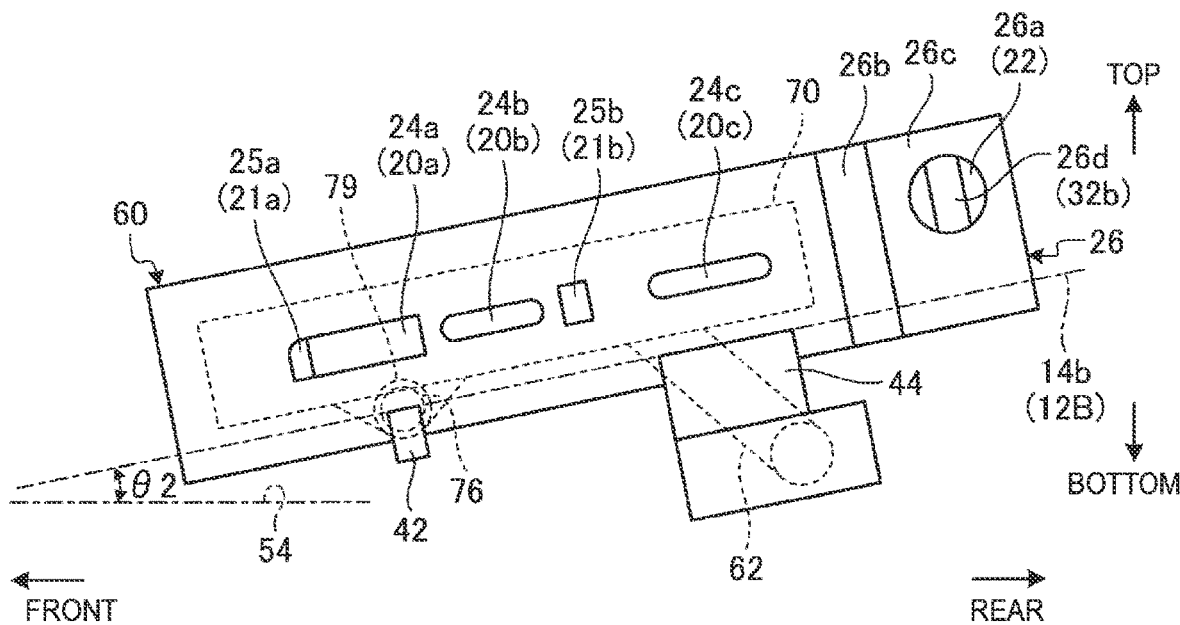
FIG. 7B is a side view schematically illustrating an operating state of the position adjustment mechanism when the portable information device illustrated in FIG. 2B is attached to the docking device.

FIG. 7A is a side view schematically illustrating an operating state of the position adjustment mechanism 56 when the portable information device 12A illustrated in FIG. 2A is attached to the docking device 10. FIG. 7B is a side view schematically illustrating an operating state of the position adjustment mechanism 56 when the portable information device 12B illustrated in FIG. 2B is attached to the docking device 10.

As illustrated in FIG. 7A, the portable information device 12A is attached to the docking device 10 with the front-down placement angle θ1. At this time, in the position adjustment mechanism 56, the lifting member 44 is pressed with the bottom surface 14b of the portable information device 12A. Thus, the lifting member 44 turns downward with the turning shaft 76 as the center together with the support member 60 coupled through the interlocking member 62 and the slide base 70. As a result, the connectors 24 and the driving portion 26 are set to the same placement angle θ1 as that of the connection terminals 20 and the operation portion 22 of the portable information device 12A.

As illustrated in FIG. 7B, the portable information device 12B is operated in substantially the same manner as in the portable information device 12A. More specifically, the portable information device 12B is attached to the docking device 10 with the front-down placement angle θ2. At this time, the connectors 24 and the driving portion 26 are set to the same angles as those of the connection terminals 20 and the operation portion 22 of the portable information device 12B. Thus, the lifting member 44 functions as a detector detecting the placement angles θ1 and θ2 of the portable information devices 12A and 12B, respectively, and, according to the detection result, the position adjustment mechanism 56 adjusts the positions of the connectors 24 and the driving portion 26 to positions where the connectors 24 and the driving portion 26 face the connection terminals 20 and the operation portion 22. The position adjustment mechanism 56 may have a configuration of moving the positions of the connectors 24 and the driving portion 26 in the forward and backward direction or in the perpendicular direction, for example.

Figure 8A:
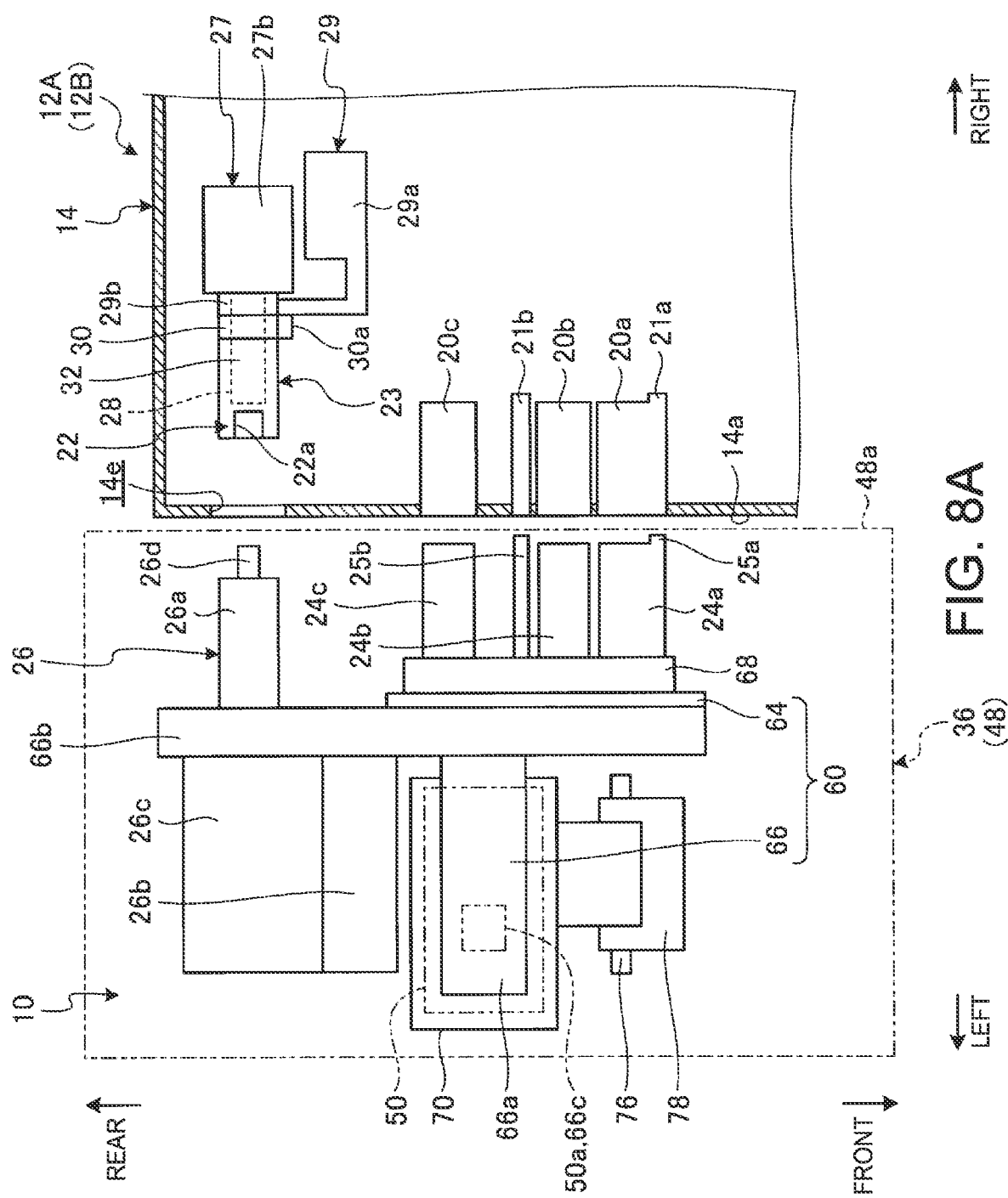
FIG. 8A is a partial cross-sectional plan view schematically illustrating a state immediately after placing the portable information device on a device placement portion.
Figure 8B:
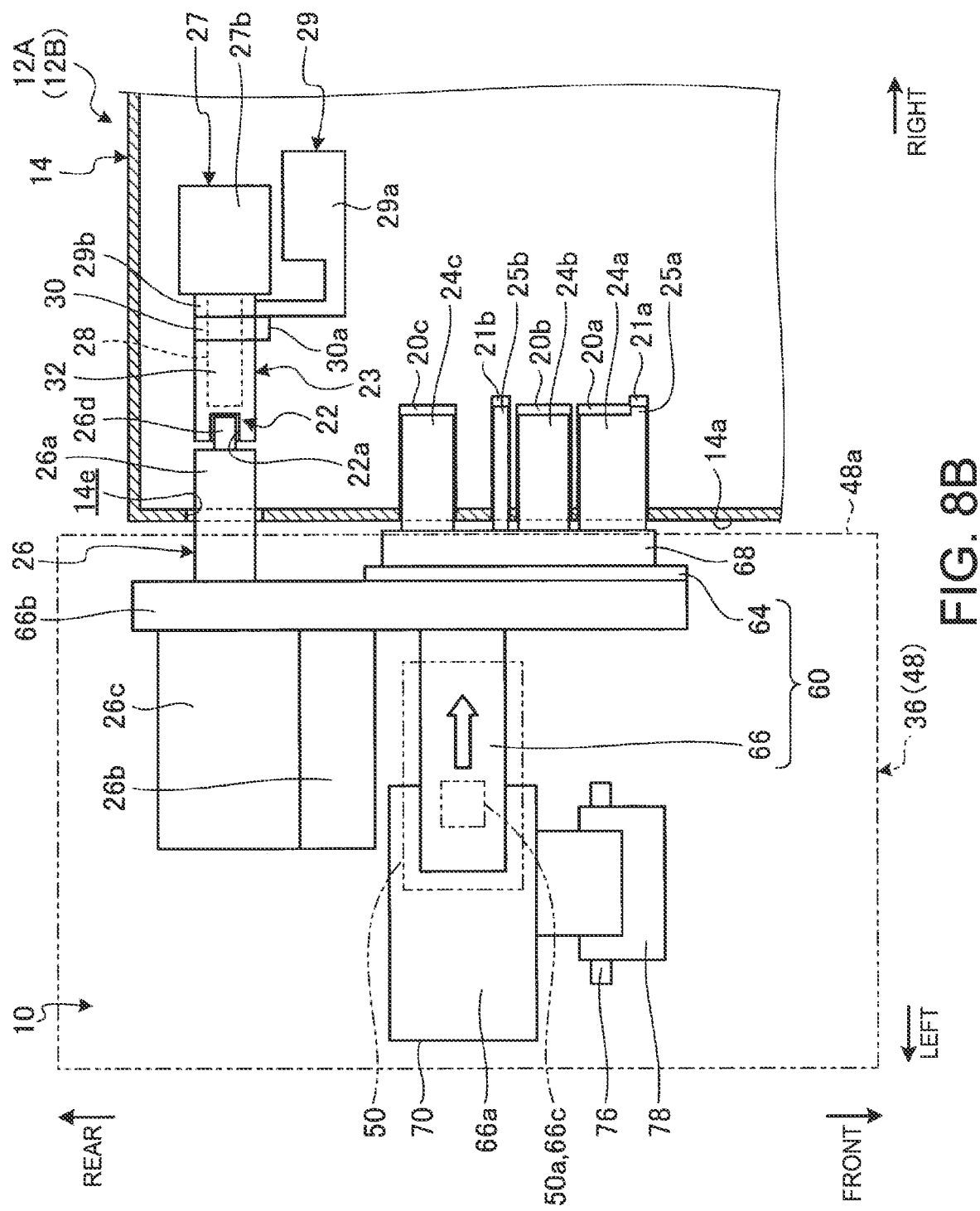
FIG. 8B is a partial cross-sectional plan view schematically illustrating a state where an advancing and retracting mechanism is operated from the state illustrated in FIG. 8A to connect a connector and a driving portion to the portable information device.

FIG. 8A is a partial cross-sectional plan view schematically illustrating a state immediately after placing the portable information device 12A on the device placement portion 34. FIG. 8B is a partial cross-sectional plan view schematically illustrating a state where the advancing and retracting mechanism 58 is operated from the state illustrated in FIG. 8A to connect the connectors 24 and the driving portion 26 to the portable information device 12A.

The advancing and retracting mechanism 58 is a mechanism advancing and retracting the connectors 24 and the driving portion 26. The advancing and retracting mechanism 58 advances and retracts the connectors 24 and the driving terminal 26a from the opening 48b formed in the wall portion 48a of the chassis 48 with an advancing and retracting operation of the operation lever 50. The advancing and retracting mechanism 58 has the operation lever 50, the support member 60, and the slide base 70.

The operation lever 50 is provided so as to be slidable in the horizontal direction on the upper surface of the chassis 48. A coupling piece 50a projecting downward is provided on the undersurface of the operation lever 50. The coupling piece 50a is inserted into a coupling hole 66c formed in the upper surface of the slide portion 66a of the slide member 66 (see FIG. 8A and FIG. 8B). The coupling piece 50a is integrally coupled to the coupling hole 66c in the horizontal direction and is slidably inserted into the coupling hole 66c in the substantially vertical direction (revolution direction).

Therefore, when the advancing and retracting mechanism 58 slides the operation lever 50 in the horizontal direction, the support member 60 slides in the horizontal direction. As a result, the connectors 24 and the driving terminal 26a advance and retract in the horizontal direction. At this time, the slide base 70 is turnably supported to the bearing member 78 through the turning shaft 76. Therefore, the advancing and retracting mechanism 58 can advance and retract the connectors 24 and the driving terminal 26a in the horizontal direction while maintaining the positions of the connectors 24 and the driving terminal 26a adjusted by the position adjustment mechanism 56.

Next, an attaching operation of the portable information devices 12A and 12B to the docking device 10 and a driving operation of the operation portion 22 by the driving portion 26 are described.

In the docking device 10, the operation lever 50 is positioned at an initial position where the operation lever 50 retracts to the left side in an initial state before attaching the portable information devices 12A and 12B (see FIG. 8A). In this state, the support member 60 is also positioned at an initial position where the support member 60 retracts to the left side and the connectors 24 and the driving terminal 26a are stored in the chassis 48. In this state, the lifting member 44 is positioned at an initial position where the lifting member 44 is most raised by the energization force of the coil spring 79 and the connectors 24 are in an angle attitude where the connectors 24 are most inclined forward and downward. More specifically, the connectors 24 and the driving terminal 26a form large angles equal to or larger than the placement angle θ2 illustrated in FIG. 7B.

The portable information devices 12A and 12B are attached to the docking device 10 in such an initial state. First, when attaching the portable information device 12A illustrated in FIG. 2A, the portable information device 12A is placed on the placement table 34a. As illustrated in FIG. 4A, the portable information device 12A is placed on the placement table 34a in a state where the rear end surface 14c is positioned by the positioning member 52 and the side surface 14a is positioned by the wall portion 48a of the chassis 48. Thus, the front end side of the portable information device 12A abuts on the use surface 54 at the landing position P and the rear end side of the portable information device 12A abuts on the leg members 42 at the reference points O, so that the portable information device 12A is placed with the placement angle θ1 to the use surface 54. Simultaneously, the bottom surface 14b of the portable information device 12A presses down the detection pin 40, so that the engagement hole 14d is engaged with the engagement projection 38 (see FIG. 5).

At this time, since the lifting member 44 is pressed down with the bottom surface 14b of the portable information device 12A set to the placement angle θ1, the support member turns through the turning shaft 76 in the position adjustment mechanism 56. Thus, the connectors 24 and the driving terminal 26a revolve downward with the turning shaft 76 as the center to be set to an angle attitude according to the placement angle θ1 as illustrated in FIG. 7A to be held at the angle attitude. As a result, the angle attitude of the connection terminals 20 and the operation portion 22 and the angle attitude of the connectors 24 and the driving terminal 26a set to the angle attitude along the placement angle θ1 are in agreement with each other and disposed facing each other.

Subsequently, the operation lever 50 is slid to the right side as illustrated in FIG. 8B. Thus, the guide pins 25a and 25b are first inserted into the guide holes 21a and 21b, respectively, and then the connectors 24a to 24c are connected to the connection terminals 20a to 20c, respectively. As a result, the portable information device 12A is electrically connected to the docking device 10, which makes it possible to use various extension functions of the docking device 10 from the portable information device 12A.

Simultaneously, the driving terminal 26a is inserted into the operation hole 14e and the device-side engagement portion 26d is engaged with the engagement portions 22a of the operation portion 22. As a result, the driving terminal 26a and the rotor 32 are brought into a coupled state in which the driving terminal 26a and the rotor 32 are integrally rotatable. Therefore, when the motor 22b is driven under a predetermined condition, the driving terminal 26a rotates to rotate the rotor 32 around an axis. As a result, the second shaft portion 30 rotates around an axis and the second attachment portion 29 also turns, and therefore the display chassis 15 electrically turns to the body chassis 14. More specifically, the operating force (torque) from the driving terminal 26a to the operation portion 22 is transmitted to the hinge mechanism 16 through the power transmission portion 23.

The rotation operation of the operation portion 22 by the driving portion 26 is automatically carried out immediately after the portable information device 12A is connected to the docking device 10, for example. Thus, the display chassis 15 of the portable information device 12A can be automatically opened simultaneously with the attachment to the docking device 10, so that the convenience improves. The rotation operation of the operation portion 22 by the driving portion 26 may be carried out based on an operation of a button, which is not illustrated, provided in the docking device 10 or the portable information device 12A, for example. Thus, a user can open and close the display chassis 15 without holding the display chassis 15 with a hand. Furthermore, the rotation operation of the operation portion 22 by the driving portion 26 may be carried out based on a recognition condition of a user with an IR camera (infrared camera), which is not illustrated, provided in the docking device 10 or the portable information device 12A. Thus, the display chassis 15 can be closed by recognizing that a user leaves from the front of the portable information device 12A attached to the docking device 10 with the IR camera, for example, so that the security can also be improved.

Next, when attaching the portable information device 12B illustrated in FIG. 2B, the portable information device 12B is placed on the placement table 34a as with the portable information device 12A. Thus, the front end side abuts on the use surface 54 at the landing position P and the rear end side abuts on the leg members 42 at the reference point O, so that the portable information device 12B is placed at the placement angle θ2 to the use surface 54.

At this time, the lifting member 44 is pressed down with the bottom surface 14b of the portable information device 12B set to the placement angle θ2 in the position adjustment mechanism 56. Therefore, the connectors 24 and the driving terminal 26a revolve downward to be set to an angle attitude according to the placement angle θ2 as illustrated in FIG. 7B to be held at the angle attitude. As a result, the angle attitude of the connection terminals 20 and the operation portion 22 and the angle attitude of the connectors 24 and the driving terminal 26a set to the angle attitude along the placement angle θ2 are in agreement with each other and disposed facing each other. Then, the operation lever 50 is slid to the right side as illustrated in FIG. 8B. Thus, the connectors 24 and the driving terminal 26a are connected to the connection terminals 20 and the operation portion 22, respectively. As a result, the portable information device 12B is electrically connected to the docking device 10. The driving portion 26 is simultaneously connected to the operation portion 22, which makes it possible to electrically turn the display chassis 15 by the driving portion 26.

On the other hand, when removing the portable information device 12A and the like attached to the docking device 10, the operation lever 50 is moved to the left side, and then the connectors 24 and the driving terminal 26a are retracted to be removed from the connection terminals 20 and the operation portion 22, respectively. As a result, the portable information device 12A and the like can be smoothly removed from the device placement portion 34.

As described above, the portable information device 12A (12B) of this embodiment is provided with the operation portion 22 operable from the outside and the power transmission portion 23 provided between the operation portion 22 and the hinge mechanisms 16 and transmitting the operating force to the operation portion 22 to the hinge mechanisms 16 to turn the body chassis 14 and the display chassis 15.

Accordingly, the portable information device 12A (12B) enables the opening and closing of the display chassis 15 using the operation portion 22. Therefore, there is no necessity of opening and closing the display chassis 15 by pressing the body chassis 14 with one hand and holding the display chassis 15 with the other hand, for example. Therefore, the display chassis 15 can be smoothly opened and closed even in the case of a handicapped user or a user whose hands are stained, for example, and thus high convenience is obtained. In the case of a configuration in which the first shaft portion 28 and the second shaft portion 30 of the hinge mechanism 16 are disposed on the display chassis 15 side, the operation portion 22 may be provided on the display chassis 15 side.

Although the configuration in which the operation portion 22 is integrally structured with the power transmission portion 23 is described above as an example, the operation portion 22 and the power transmission portion 23 may be separate structures. In the case of the separate structures, a predetermined gear mechanism and the like may be placed between the operation portion 22 and the hinge mechanism 16. The operation portion 22 may be directly formed in the first shaft portion 28 or the second shaft portion 30 serving as the rotation shaft of the hinge mechanism 16. In this case, the first shaft portion 28 or the second shaft portion 30 also functions as the power transmission portion 23. Furthermore, although the configuration in which the engagement portions 22a of the operation portion 22 are configured by recessed portions and the device-side engagement portion 26d of the driving terminal 26a is formed by a protruding portion is described above as an example, the engagement portions 22a may be formed into protruding portions and the device-side engagement portion 26d may be formed into a recessed portion. More specifically, the engagement portions 22a and the device-side engagement portion 26d may have any shape or structure insofar as the engagement portions 22a and the device-side engagement portion 26d are detachably attached so as to be able to mutually transmit power.

The portable information device 12A (12B) can also be used independently without being attached to the docking device 10. In this case, a compact device exclusive for the operation of the operation portion 22 carrying the same configuration as that of the driving portion 26 of the docking device 10 may be connected to perform the electrical opening and closing of the display chassis 15, for example. Moreover, the docking device 10 may be provided as one function of a machine tool, a transportation machine, or the like. In this case, the portable information device 12A (12B) may be attached to the machine tool, the transportation machine, or the like to be utilized.

In the portable information device 12A (12B), the rotor 32 is provided coaxially and integrally rotatable with the second shaft portion 30 of the display chassis 15. Therefore, a torque of the rotor 32 as it is can be utilized for the rotation of the second shaft portion 30. Therefore, there is no necessity of providing a complicated gear mechanism and the like in the body chassis 14 or the display chassis 15, and thus a reduction in thickness or weight thereof is not blocked.

Moreover, the docking device 10 according to this embodiment is provided with the driving portion 26 having the driving terminal 26a performing a rotation operation to the hinge mechanism 16 of the portable information device 12A (12B) placed on the device placement portion 34 to thereby open and close the display chassis 15.

Accordingly, the docking device 10 allows the opening and closing of the display chassis 15 of the attached portable information device 12A (12B) through the driving portion 26. Therefore, the display chassis 15 of the portable information device 12A (12B) attached to the docking device 10 can be smoothly opened and closed even in the case of a handicapped user or a user whose hands are stained, for example, and thus high convenience is obtained.

It is a matter of course that the present invention is not limited to the embodiments described above and can be freely altered without deviating from the gist of the present invention.

The embodiments described above describe, as an example, the configuration in which the docking device 10 is provided with the position adjustment mechanism 56 adjusting the position of the driving portion 26 according to the position of each of the attached portable information devices 12A and 12B. However, the docking device 10 may not be provided with the position adjustment mechanism 56 in the case of a specification in which the placement angles of the portable information devices 12A and 12B to be attached are the same, for example.

The embodiments described above describe, as an example, the configuration in which the driving portion 26 and the connectors 24 provided in the connection mechanism portion 36 erecting on the side portion of the operation portion 22 and the connection terminals 20 are connected to the operation portion 22 and the connection terminals 20, respectively, provided on the side surface 14a of each of the portable information devices 12A and 12B. However, the portable information device may be configured so that the operation portion 22 and the connection terminals 20 are provided on the bottom surface 14b of each of the portable information devices 12A and 12B and the driving portion 26 and the connectors 24 are provided on the upper surface of the placement table 34a. In such a configuration, a predetermined gear mechanism and the like may be placed between the operation portion 22 and the hinge mechanism 16.

The embodiments described above describe, as an example, the hinge mechanism 16 of a single axis structure in which the first shaft portion 28 on the body chassis 14 side and the second shaft portion 30 on the display chassis 15 side are coaxially configured and the second shaft portion substantially functions as a bearing. However, a configuration may be acceptable in which the first shaft portion 28 is functioned as a bearing and the second shaft portion 30 is used as the shaft, for example. Moreover, the hinge mechanism 16 may have a biaxial structure in which the first shaft portion 28 and the second shaft portion 30 each have a shaft shape and are disposed in parallel to each other, for example. In this case, the operation portion 22 may be provided so as to be able to rotate either one of the first shaft portion 28 or the second shaft portion 30.

The embodiments described above describe, as an example, the portable information devices 12A and 12B which are Laptop PCs. However, portable information devices may have a configuration in which at least two chassis are turnably coupled by a hinge mechanism.

The invention claimed is:

1. A docking device which is detachably connectable to a portable information device in which a first chassis and a second chassis are turnably coupled by a hinge mechanism, the docking device comprising:
a device placement portion on which the portable information device can be placed; and
a driving portion having a driving terminal for a turning operation to the hinge mechanism of the portable information device placed on the device placement portion.

2. The docking device according to claim 1, wherein:
the driving terminal has a drive-side engagement portion configured to be engaged with an engagement portion in the portable information device.

3. The docking device according to claim 2, wherein:
the driving portion has a motor rotating the driving terminal.

4. The docking device according to claim 2 further comprising:
a connection mechanism portion on a side portion of the device placement portion and disposed facing a side surface of the portable information device placed on the device placement portion, wherein:
the driving terminal is configured to advance and retract to/from the side surface of the portable information device from the connection mechanism portion.

5. The docking device according to claim 4, wherein:
the device placement portion is configured to place the portable information device with a front-down angle attitude by supporting a rear end side of the portable information device having a front end side to be disposed on a use surface,
the driving terminal is turnably supported to the connection mechanism portion, and
a position adjustment mechanism configured to adjust the driving terminal to a position where the driving terminal can be engaged with the engagement portion according to a placement angle of the portable information device placed on the device placement portion.

6. The docking device according to claim 5 further comprising:
a connector movably supported to the device placement portion together with the driving terminal and connectable to a connection terminal on the side surface of the portable information device placed on the device placement portion, wherein:
the position adjustment mechanism moves the connector together with the driving portion according to the placement angle to adjust the connector to a position where the connector can be connected to the connection terminal.

* * * * *